(12) United States Patent
Lundin et al.

(10) Patent No.: US 7,855,980 B2
(45) Date of Patent: *Dec. 21, 2010

(54) IDENTIFICATION OF THE CONFIGURATION TOPOLOGY, EXISTING SWITCHES, AND MISWIRES IN A SWITCHED NETWORK

(75) Inventors: LeRoy R. Lundin, West Hurley, NY (US); Casandra H. Qiu, Hopewell Junction, NY (US); Aruna V. Ramanan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 12/367,611

(22) Filed: Feb. 9, 2009

(65) Prior Publication Data
US 2009/0141643 A1 Jun. 4, 2009

Related U.S. Application Data

(63) Continuation of application No. 10/962,635, filed on Oct. 11, 2004, now Pat. No. 7,522,541.

(51) Int. Cl.
H04L 12/28 (2006.01)
(52) U.S. Cl. ...................................... 370/255

(58) Field of Classification Search ................. None
See application file for complete search history.

(56) References Cited

U.S. PATENT DOCUMENTS

| 6,243,361 B1 | 6/2001 | McMillen et al. |
| 2005/0071843 A1 | 3/2005 | Guo et al. |
| 2005/0201292 A1 | 9/2005 | Bomhoff et al. |
| 2005/0243739 A1 | 11/2005 | Anderson et al. |

*Primary Examiner*—Gregory B Sefcheck
*Assistant Examiner*—Suk Jin Kang
(74) *Attorney, Agent, or Firm*—Cantor Colburn LLP; Justin Dillon (57) ABSTRACT

An exemplary method of identifying configuration topology, existing switches, and miswires in a given network is provided. Given a number of switches, which may be less than the maximum possible for the actual configuration and some ports of which may be miswired, generate a hypothesis for the supported topology of which the existing configuration is a subset. A best fit of the existing switches to the supported number switches of the maximal topology is performed, using formulae for the connections of the maximal supported topology. If supported switches are found missing in the assumed topology, the switch count is increased accordingly, and started over with a new hypothesis. When satisfied with identification, all switch ports are revisited and the connection formulae is used to identify all miswires.

10 Claims, 8 Drawing Sheets

High Level Flowchart

FIG. 1

The High Performance Switch Board
Eight chips per board, eight ports per chip

This figure shows a switch board with 8 switch chips.
Each chip has 8 ports. For an NSB, the external ports
of Chips 4 through 7 are designated as adapter ports
(4 adapters have been labeled)

FIG. 2

FIG. 3
4NSB - 2 ISB Topology
Provides up to 64 adapter connection ports
(all links are not shown)

FIG. 4
8NSB - 4 ISB Topology
Provides up to 64 adapter connection ports
(all links are not shown)

FIG. 5A

High Level Flowchart

FIG. 5B
SubRoutines idISB

For each ISB i in the maximal config:
    For each actual board b:
        Compute iMeas[i,b] = the number of
            external ports for chips 0-3
        for which
    swch [b].nbrChip=theo[i].nbrChip
        and
    swch [b].nbrPort=theo[i].nbrPort Rank the values iMeas[i,b] in descending order. The top, non-zero values indicate which board b is the corresponding ISB i. (A cutoff is used to prevent miswires from clouding the issue.) Set
    swch[b]. logicalBoardNumber = i Note. Boards will be numbered ISB first, followed by NSB.

Some ISB for the maximal configuration may be missing, say M of them, and some existing boards may not have been assigned If the number of actual boards were M greater, the hypothesized topology should be larger. If so, recompute the topology, and return indicating dissastisfaction.

FIG. 5C
SubRoutines

FIG. 5D
SubRoutines

IDENTIFICATION OF THE CONFIGURATION TOPOLOGY, EXISTING SWITCHES, AND MISWIRES IN A SWITCHED NETWORK

CROSS-REFERENCE TO RELATED APPLICATION

This application is a continuation of U.S. patent application Ser. No. 10/962,635, filed Oct. 11, 2004, now U.S. Pat. No. 7,522,541, the disclosure of which is incorporated by reference herein in its entirety.

BACKGROUND

The present invention relates generally to network computing, network architecture, network management, and network switching and, in particular, to topology identification and miswire detection.

The fabric of a high performance switched network included a sequence of numbered switches connected in any of several configurations. The network manager for this switched network was able to identify the managed network through specific input. The network manager required that the topology be manually specified by name and that the individual switch members be specified by number and location. There would be a significant improvement if software could identify the network switches by observing the switch-to-switch connections and, then, computing the needed information, such as the configuration topology, the switch numbers, and any miswires in the network.

SUMMARY

In an exemplary embodiment, a computer storage medium having computer readable instructions stored thereon that, when executed by a computer, implement a method of identifying configuration topologies, existing switches, and miswires in a switched network, wherein the method includes receiving an existing configuration; generating a hypothesis, the hypothesis being one supported topology of a plurality of supported topologies of which the existing configuration is a subset, the existing configuration having at least one existing switch, the supported topology having at least one supported switch; performing a best fit of the at least one existing switch to the at least one supported switch using formulae for connections of a maximal supported topology comprising the plurality of supported topologies, wherein the formulae indicate how the existing switches should be connected; and identifying the existing configuration as the one of the supported topologies.

In another embodiment, a system includes a processor in communication with a storage device and with a switched network, the storage device including a network manager configured to implement a method of identification of configuration topologies, existing switches, and miswires in the switched network, wherein the method includes receiving an existing configuration; generating a hypothesis, the hypothesis being one supported topology of a plurality of supported topologies of which the existing configuration is a subset, the existing configuration having at least one existing switch, the supported topology having at least one supported switch; performing a best fit of the at least one existing switch to the at least one supported switch using formulae for connections of a maximal supported topology comprising the plurality of supported topologies, wherein the formulae indicate how the existing switches should be connected; and identifying the existing configuration as the one of the supported topologies.

BRIEF DESCRIPTION OF THE SEVERAL VIEWS OF THE DRAWINGS

These and other features, aspects, and advantages of the present invention will become better understood with regard to the following description, appended claims, and accompanying drawings, where:

DETAILED DESCRIPTION OF THE INVENTION

Exemplary systems, methods, and software products for identification of the configuration topology, existing switches, and miswires in a switched network are provided.

Figure 1:
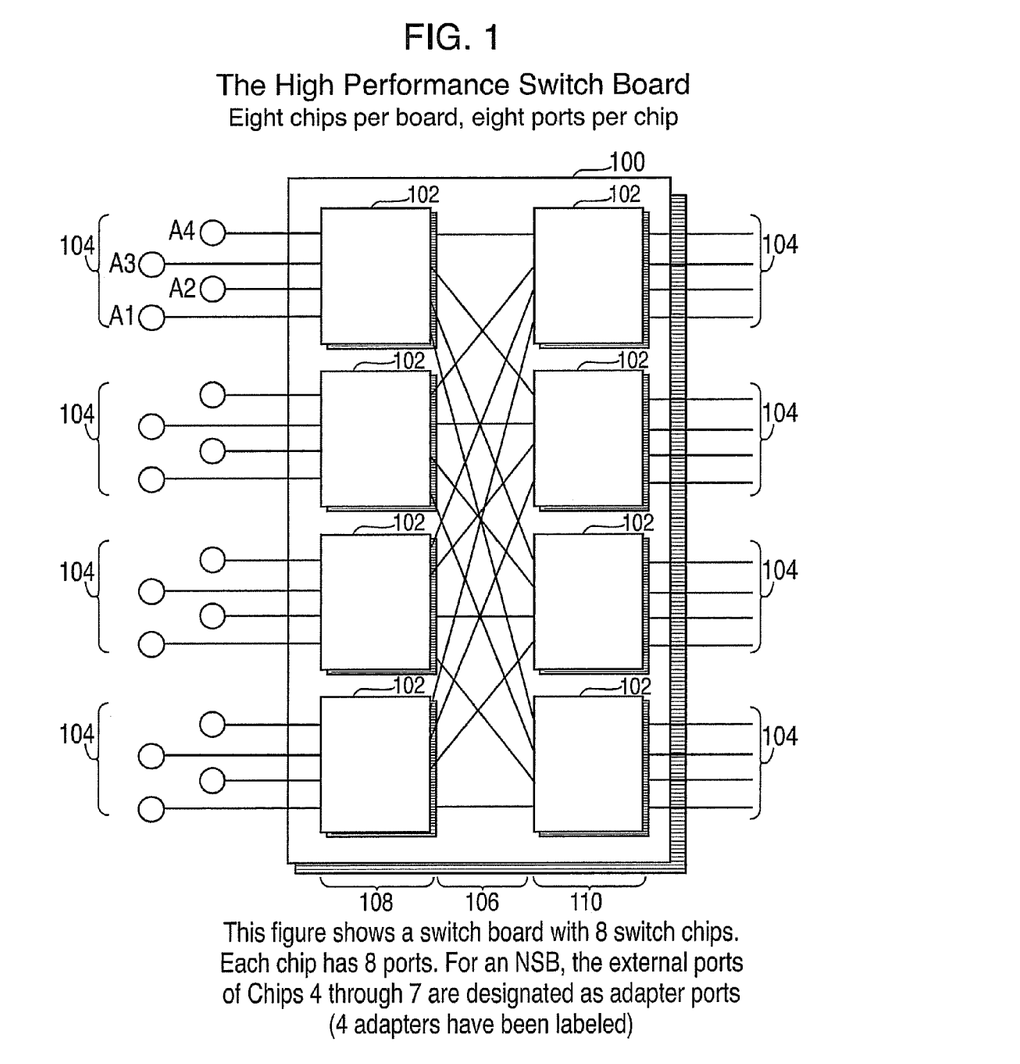
FIG. 1 shows an exemplary embodiment of a switch board with eight switch chips and eight ports per chip.

FIG. 1 shows an exemplary embodiment of a switch board 100 with eight switch chips (switches) 102 and eight external switch ports 104 per chip. A switch provides a communication path between computers. The computers connect to the switch via adapters. Adapters attach at the external switch ports 104. Anywhere from 1 to 48 such switch boards 100 are used to form a particular size network, in some typical embodiments. In some embodiments, the network is used to support parallel computing via message passing. In each supported network, some of the external switch ports 104 are used to attach adapters installed in the computers, which are members of the network. Other external switch ports 104 are used to connect the switches together. The internal ports 106 provide the switching among the switches 102 on the switch board 100.

There is an exemplary method of identifying configuration topology, existing switches, and miswires in a given network. Given a number of switches, which may be less than the maximum possible for the actual configuration and some ports of which may be miswired, generate a hypothesis for the supported topology of which the existing configuration is a subset. Perform a best fit of the existing switches to the supported number of switches of the maximal topology, using formulae for the connections of the maximal supported topology. If supported switches are found missing, increase the switch count accordingly, and start over with a new hypothesis. When satisfied with identification, revisit all switch ports and use the connection formulae to identify all miswires.

Formulae can be laid down for each of the supported configurations to indicate how switches should be connected. In one embodiment, formulae are stored for all supported configurations. This eliminates the need to specify connection information for each port. Switches and ports are typically numbered, e.g., switch 1, switch 2, . . . switch 8. Connections in the formulae typically include connecting switch 7 to switch 14 at port 12 and the like. Switches may have different types, such as node switch board (NSB), intermediate switch board (ISB), and the like. A formula may include, for example, NSB 7 connects to ISB 6 at port 2.

An NSB attaches to an adapter, which attaches to a machine performing computing tasks, such as parallel computing as well as other switches. An ISB provides additional paths among the NSBs. If different types of switches are used, it is determined how many chips are enclosed on a board and how many ports each chip has. Then, different formulae are computed and different topologies are supported.

In an exemplary embodiment, supported configurations include a single switch, two switches connected to each other, and three switches connected to each other. However, a configuration having four switches connected to each other is not supported. Next, six switches, "4 NSB-2 ISB" topology is a supported configuration. After that is as many as 8 NSBs and 4 ISBs is a supported. The next one is 8 ISBs and as many as 16 NSBs, etc. The maximum size topology supported is 16 ISBs and 32 NSBs or 48 switches all together, in this exemplary embodiment. Of course, the present invention is not limited to any particular supported configurations. In one embodiment, there are two parallel copies of each supported configuration on, one on each of two network planes, for a maximum of 96 switches. The two network planes increase bandwidth.

Supported configurations may be sparsely cabled together, for example to allow for growth, such as 6 switches (4 NSB-2 ISB) for now with plans for 4 ISB-8 NSB. Supported configurations are maximal, while topologies are actual within the maximal. In this example, the supported configuration is 4 ISB-8 NSB, while the actual topology is 4 NSB-2 ISB. Thus, sparse configurations may match (or be a best fit) to larger supported configurations. Switches may be missing if the number of switches in an actual topology is less than the number of switches in the matching supported configuration. After determining the matching supporting configuration, miswires may be identified by examining the actual connections in comparison with the formulae for that supported configuration.

An exemplary high performance switch configuration employs common switch building blocks in two ways: (1) an NSB, to which up to 16 computer adapters attach and up to 16 other adapters attach, and (2) an ISB, which connects up to 32 NSBs, thereby allowing all adapters to communicate with each other. These switches are cabled together according to certain rules to form a desired network topology.

Figure 2:
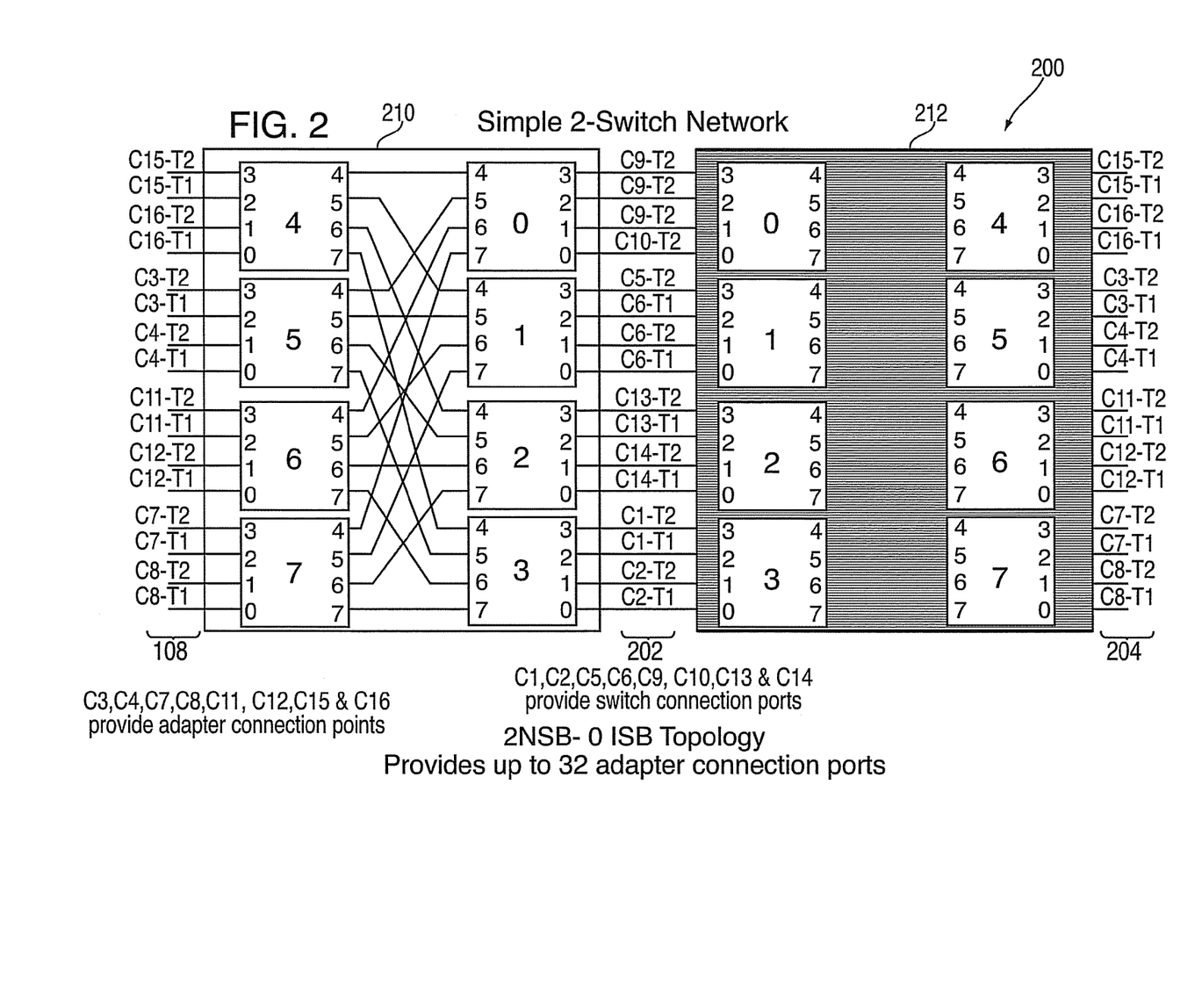
FIG. 2 shows an exemplary embodiment of a simple two-switch network.
Figure 3:
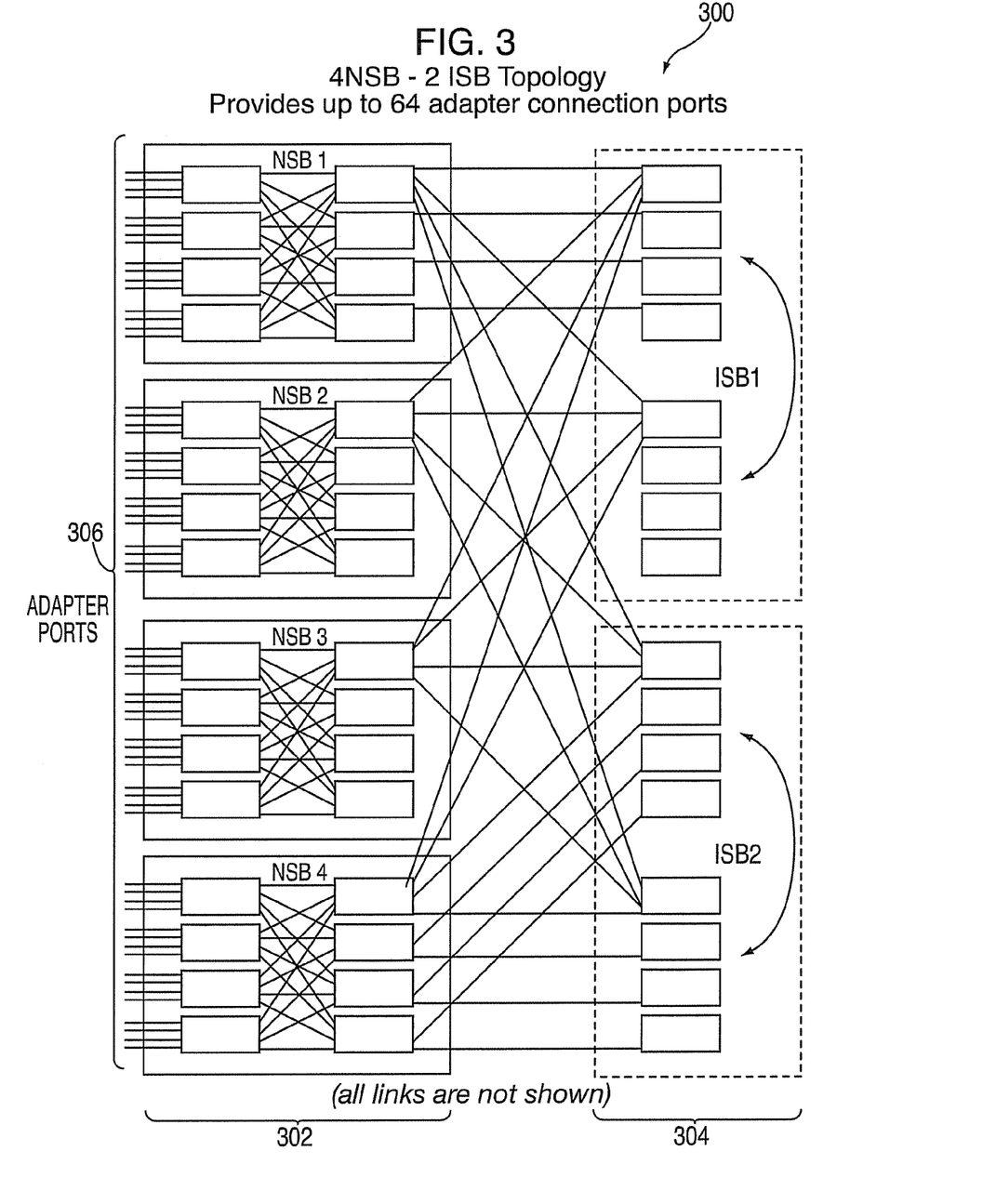
FIG. 3 shows an exemplary embodiment of a "4 NSB-2 ISB" topology that provides up to 64 adapter connection ports.
Figure 4:
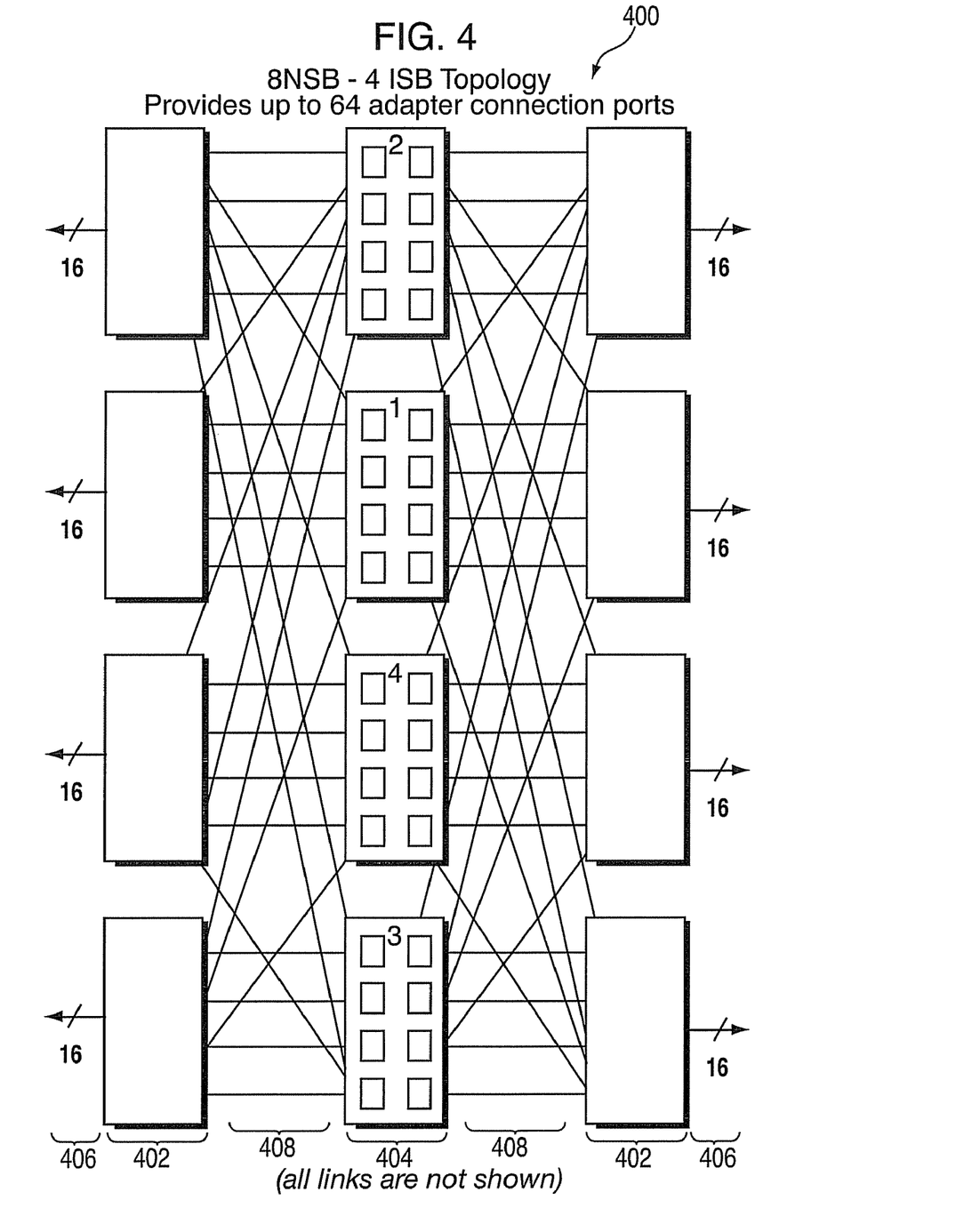
FIG. 4 shows an exemplary embodiment of an "8 NSB-4 ISB" topology that provides up to 128 adapter connection ports.

For the exemplary one-switch network, represented in FIG. 1, only the external switch ports 104 on the four chips on the left 108 may have adapters connected, providing 16 adapter connections. The four chips on the right 110 are reserved for switch-to-switch connections. FIGS. 2-4 provide examples of multi-switch networks.

FIG. 2 shows an exemplary embodiment of a simple two-switch network 200, having a first switch 210 and a second switch 212. While FIG. 1 depicts one switch board 100, FIG. 2 has two such switch boards 210, 212, which enlarges the network and provides for more adapters. Each switch 210, 212 has switch chips numbered 0, 1, 2, . . . 7. The respective switch-to-switch connections 202 (labeled C1, C2, C5, C6, C9, C10, C13, and C14) are attached to each other, leaving the 32 adapter connections 108, 204 (labeled C3, C4, C7, C8, C11, C12, C15, and C16) for connecting a cluster of computers. A computer attached to C15-T2 on switch 210, for example, could send a message to another computer attached to C8-T1 on switch 212.

The switches 210, 212 of the network 200 are cabled to each other in accordance with certain rules so that the network manager may compute routes to support message passing. A network manager is software that recognizes networks, determines routes, initializes networks, monitoring networks for errors, logging errors, and the like. In one embodiment, a method for identifying configuration topology, existing switches, and miswires in a given network is included in the part of the network manager that recognizes networks. Adapters 700 in the network 604 need to know the routes for sending messages to the correct partner across the network 604. Given the topology, the routes are computed. Once computed, these routes are loaded on the adapters to make message passing from any source to any destination possible and to provide cumulative bandwidth for the cluster. The preferred embodiment has fast message passing and an optimal cumulative bandwidth.

When the number of NSB is four or greater, additional switches (ISB) are added to the network 200 to maximize network bandwidth. All 32 ports of an ISB are used only to connect to the NSB.

FIG. 3 shows an exemplary embodiment of a "4 NSB-2 ISB" topology 300. The topology 300 has uses six switches, 4 NSBs 302 and 2 ISBs 304, and provides up to 64 adapter connection ports 306. A particular parallel cluster might have a sparse configuration of this topology. For example, a configuration might be a 3 NSB-2 ISB or a 3 NSB-1 ISB, but the inter-switch connections need to obey a subset of rules for the maximal topology in order for the network manager to supply the correct routes for the configuration. The 4 NSB-2 ISB topology shown in FIG. 3 provides up to 64 adapter connection ports. Suppose NSB 2 were missing. Then, the configuration would be a 3 NSB-2 ISB but the supported topology would be 4 NSB-2 ISB.

FIG. 4 shows an exemplary embodiment of an "8 NSB-4 ISB" topology 400. The topology 400 has 8 NSBs 402 and 4 ISBs 404 and provides up to 128 adapter connection ports 406. Again, a specific configuration could be sparse, but if cabled in accordance with this topology's rules, the network manager recognizes this so that the correct routes are generated.

To support identification of the switch-to-switch connections 408 in the network, a location identification register and neighbor identification register are placed at each port. When the switches are powered, the switch ships exchange their identifications across their connections. The network manager reads these registers after the switches are powered and builds a database store holding all connection information. An exemplary relational database table, called a link table, has the form {frame1, slot1, chip1, port1, frame2, slot2, port2, stat}, meaning that chip1-port1 of the switch physically located at slot1 of frame1 is cabled to chip2-port2 of the switch physically located at slot2 of frame2 and that status of the link is stat.

FIGS. 5A, 5B, 5C, and 5D show a flow chart (5A) of an exemplary method of topology identification and miswire detection, including pseudo code for exemplary subroutines (5B-5D). The present invention is not limited to subroutines and may use any kind of software organization, such as modules, objects, and the like.

Figure 5A:
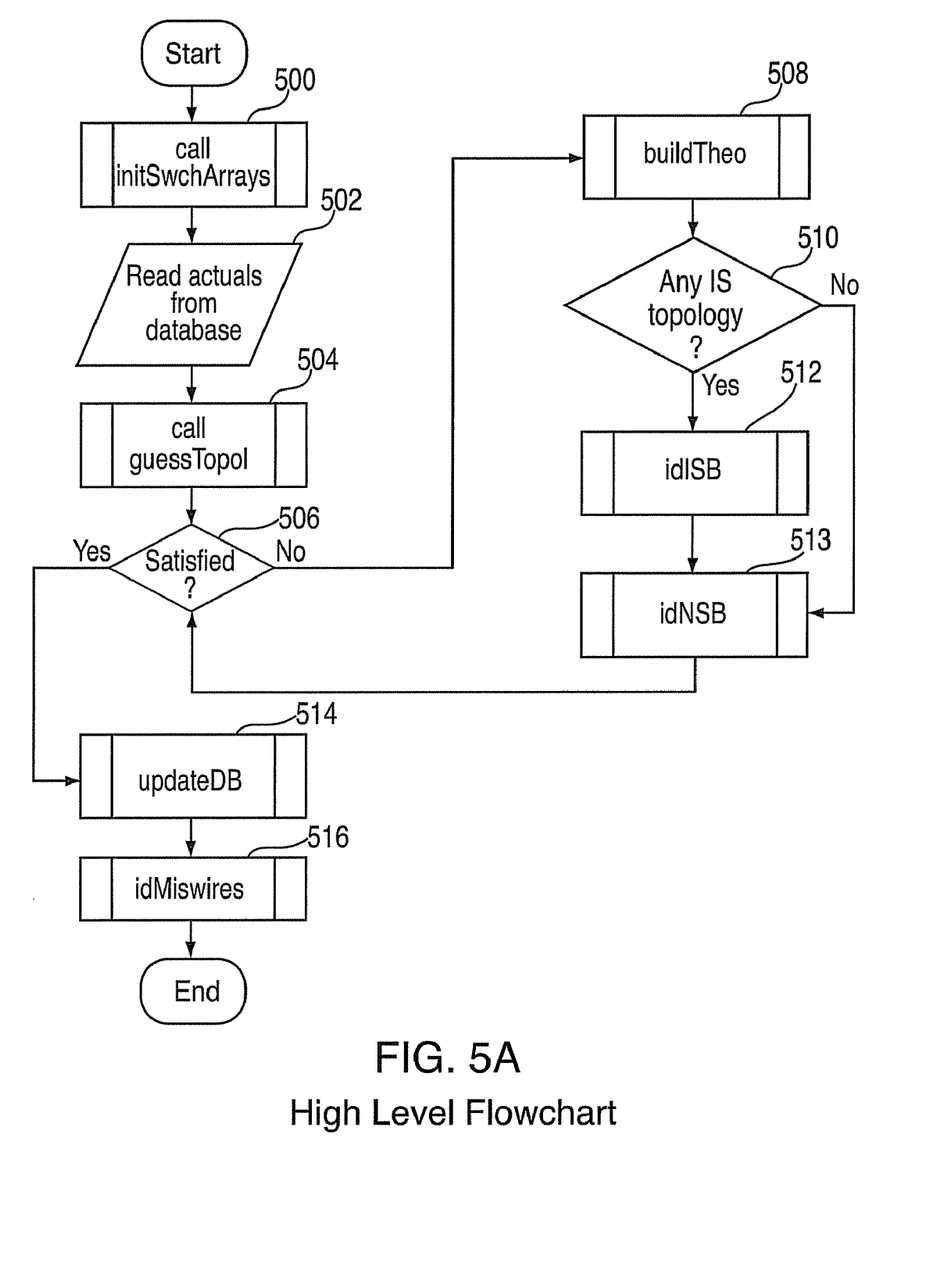
FIGS. 5A, 5B, 5C, and 5D show a flow chart of an exemplary method of topology identification and miswire detection, including exemplary subroutines.

FIG. 5A is a high-level flow chart representing instructions capable of being executed on a processor and stored on a storage medium. The instructions perform an exemplary method of topology identification and miswire detection. A subroutine called initSwchArrays (See FIG. 5B) is called at 500, ACTUALs are read from a database at 502, and a subroutine called guessTopol (See FIG. 5B) is called at 504. Then, a loop is entered and repeated until satisfied at 506. If not satisfied, a subroutine called buildTheo (See FIG. 5B) is called at 508. Then, it is determined if there is any ISB in the topology at 510. If so, a subroutine called idISB (See FIG. 5C) is called at 512. If there was not any ISB topology or after idISB is called at 512, a subroutine called idNSB (See FIG. 5D) is called at 513. Then, the loop test is performed again at 506. If not satisfied, then 508-513 are performed again, else a subroutine called updateDB (See FIG. 5B) is called at 514 and a subroutine called idMiswires (See FIG. 5B) is called at 516.

The following Table 1 shows pseudo code for the exemplary method of topology identification and miswire detection.

TABLE 1

Exemplary pseudo code

Initialization includes computing and encoding formulae that indicate how the switches are correctly connected to each other in each supported configuration. Given a link table representing the network's switch connections, define ACTUAL to be the number of switch boards in the configuration. Let MAXIMAL denote the number of boards in the smallest topology for which MAXIMAL >= ACTUAL and assume this is the existing topology. Let LOGICAL = MAXIMAL.
Do the following until satisfied:
1.  For each ISB in the assumed topology supported configuration, use the formulae to measure each existing switch's likelihood to be that ISB.
2.  Rank the measurements of Step 1 from largest to smallest, and then use this ranking to identify the ISB, which are present by choosing all measurements greater than some constant.
3.  If specific ISB are apparently missing above, say L of them, compare ACTUAL + L to MAXIMAL. If ACTUAL + L > MAXIMAL, increase the LOGICAL configuration switch count appropriately, i.e., LOGICAL = LOGICAL + L. Recompute the new MAXIMAL topology based on LOGICAL and return to Step 1 unsatisfied and with the updated LOGICAL switch count.
4.  For each NSB in the assumed topology, use the identified ISBs and the formulae to measure each remaining switch's likelihood to be that NSB.
5.  Rank the measurements of step 4 from largest to smallest and, then, use this ranking to identify the NSB that are present.
6.  If specific NSB are apparently missing (e.g., non-identifiable) above, say M of them, compare ACTUAL + M to MAXIMAL. If ACTUAL + M > MAXIMAL, increase the LOGICAL configuration switch count appropriately, i.e., LOGICAL = LOGICAL + M. Recompute the new MAXIMAL topology based on LOGICAL and return to step 1 unsatisfied and with the updated LOGICAL switch count.
If the loop is exited in satisfied fashion, check all switch-to-switch connections against the formulae to identify any miswires.

Figure 5B:
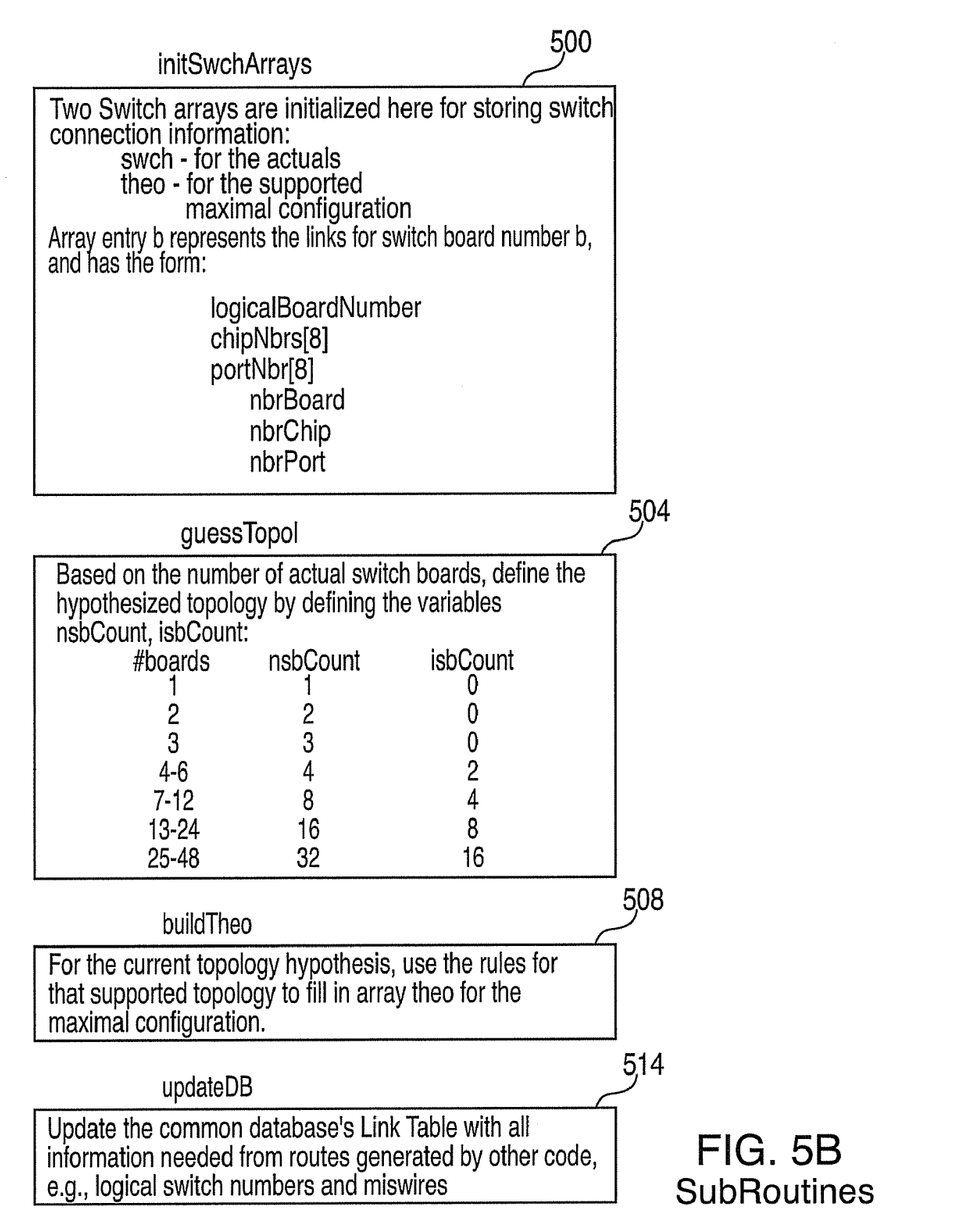

The subroutine initSwchArrays in the exemplary embodiment shown in FIG. 5B initializes two switch arrays for storing switch connection information: swch for the actuals and theo for the supported maximal configuration. Array entry b represents the links for switch board number b and has the form {logicalBoardNumber, chipNbrs[8], portNbr[8]} where portNbr[8] includes {nbrBoard, nbrChip nbrport}. The variable "logicalBoardNumber" holds a sequential identifier identifying a switch board in the topology, such as ISB 1, ISB 2, NSB 1, NSB 2, NSB 3, and NSB 4 in FIG. 3. The variable "chipNbrs[8]" holds identifiers identifying a switch chip, such as switch 210 in FIG. 2 which has switch chips numbered 0, 1, 2, . . . 7. The variable "portNbr[8]" holds identifiers identifying a port, such as ports C15-T2 and C2-T1 in FIG. 2. The variable "nbrBoard" holds an identifier identifying the switch board connected to by the port that is identified by portNbr[8]. The variable "nbrChip" holds an identifier identifying the switch chip number connected to by the port identified by portNbr[8]. The variable "nbrport" holds an identifier identifying the port connected to by the port identified by portNbr[8]. In other words, the port in portNbr[8] connects to the switch chip in nbrChip on the switch board in nbrBoard through the port in nbrPort.

The subroutine guessTopol in the exemplary embodiment shown in FIG. 5B defines a hypothesized topology based on the number of actual switch boards. The hypothesized topology is defined by defining the variables nsbCount and IsbCount.

The subroutine buildTheo in the exemplary embodiment shown in FIG. 5B uses the rules for the supported topology of the current hypothesis to fill in array theo for the maximal configuration.

The subroutine updateDB in the exemplary embodiment shown in FIG. 5B updates a link table in a common database with the information needed from routes generated by other code, e.g., logical switch numbers and miswires.

Figure 5C:
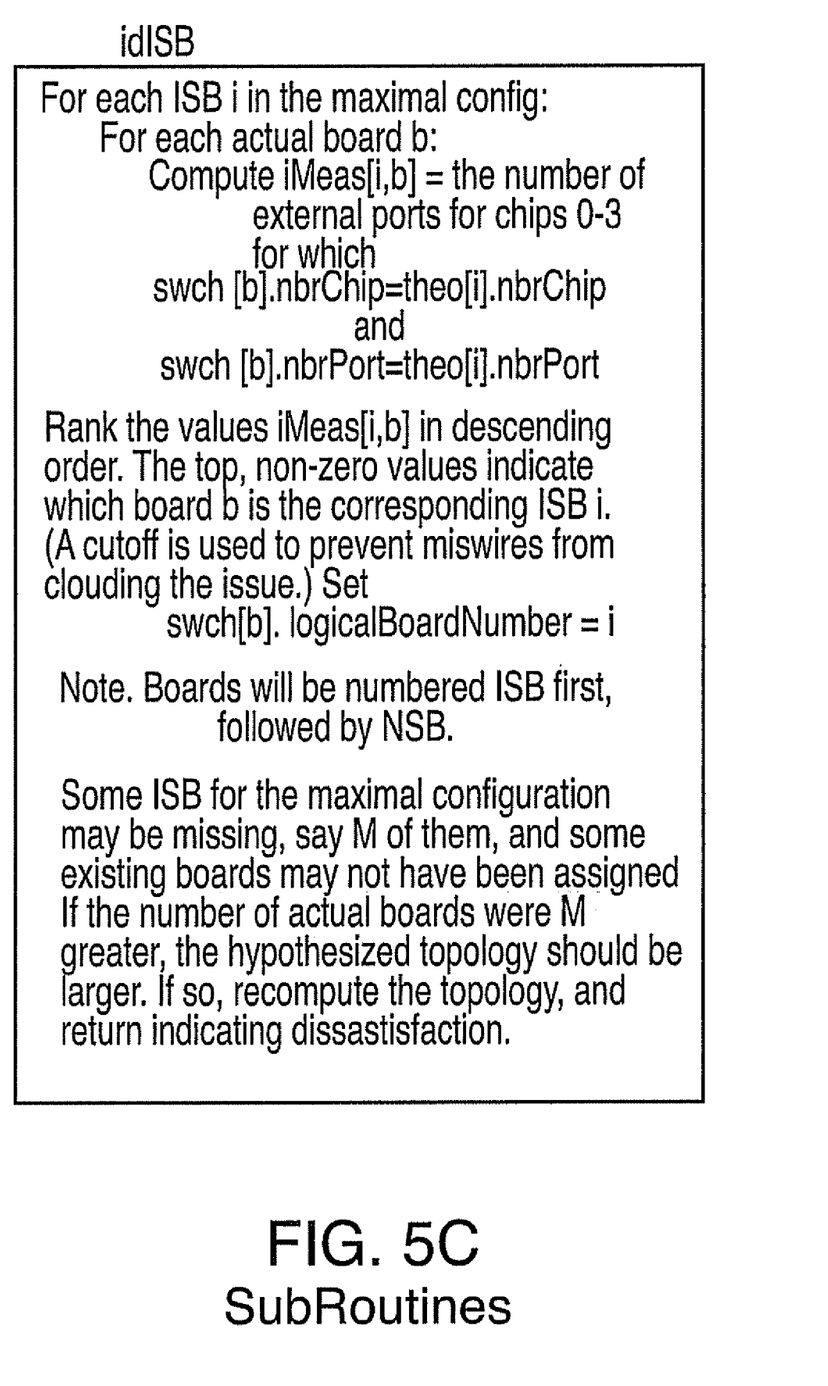

The subroutine idISB in the exemplary embodiment shown in FIG. 5C computes iMeas[i, b] for each ISB, i, in the maximal configuration and each actual board, b. The iMeas[i, b] is the number of external ports for chips 0-3 for which swch[b].nbrChip=theo[i].nbrChip and swch[b].nbrPort=theo[i].nbrPort. The values iMeas[i, b] is ranked in descending order. The top, non-zero values indicate which board b is the corresponding ISB i. A cutoff is used to prevent miswires from clouding the issue. Set swch[b].logicalBoardNumber=i. Note that boards are numbered ISB first, followed by NSB. Some ISB for the maximal configuration may be missing, say M of them, and some existing boards may not have been assigned. If the number of actual boards were M greater, the hypothesized topology may be larger. If so, the topology is recomputed and a flag is returned indicating dissatisfaction.

Figure 5D:
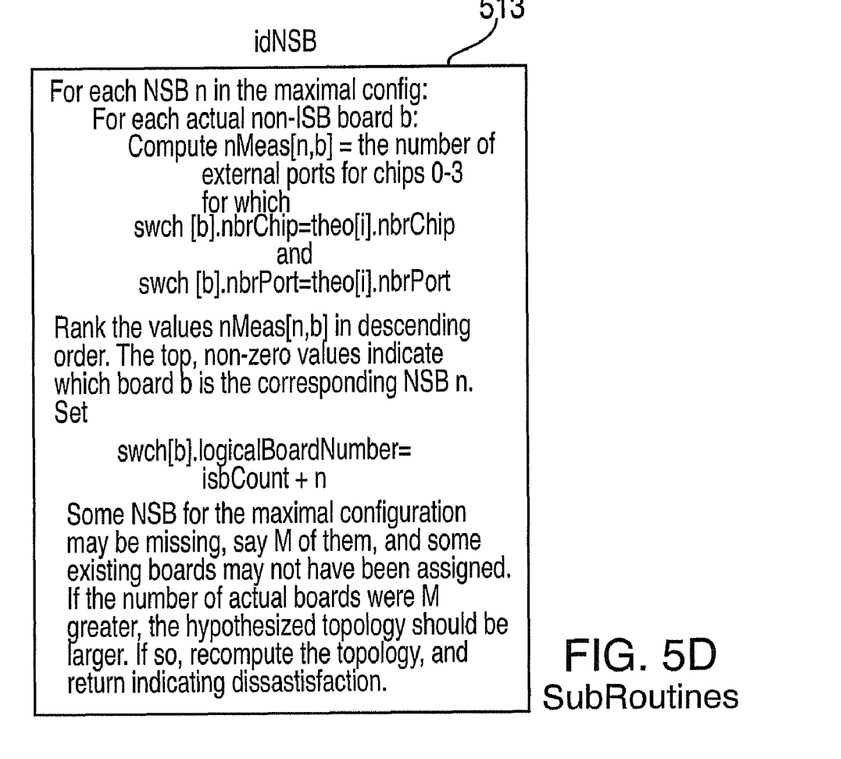

The subroutine idNSB in the exemplary embodiment shown in FIG. 5D computes nMeas[n, b] for each NSB, n, in the maximal configuration and for each actual non-ISB board, b. Array entry nMeas[n, b] is the number of external ports for chips 0-3 for which swch[b].nbrBoard=theo[n].nbrBoard, swch[b].nbrChip=theo[n].nbrChip and swch[b].nbrPort=theo[n].nbrPort. The values nMeas[n, b] are ranked in descending order. The top, non-zero values indicate which board is the corresponding NSB n. Set swch[b].logicalBoardNumber=isbCount+n. Some NSB for the maximal configuration may be missing, say M of them, and some existing boards may not have been assigned. If the number of actual boards were M greater, the hypothesized topology would be larger. If so, the topology is recomputed and a flag is returned indicating dissatisfaction.

For example, consider a configuration having 5 switches, but which is connected following the rules for an "8 NSB-4 ISB" topology (see, e.g., FIG. 4), in which the switches present are NSB 2 and 7 and ISB 1, 3, and 4. This is a sparsely configured "8 NSB-4 ISB" topology. Further, suppose that during the installation, 2 cables have been miswired (swapped) on the NSB end. With only 5 switches present, the initial hypothesis for the topology is "4 NSB-2 ISB" (see e.g., FIG. 3), LOGICAL=5 and MAXIMAL=6. The rules for connecting a "4 NSB-2 ISB" (see, e.g., FIG. 3) topology are shown in Table 2.

TABLE 2

Exemplary rules for connecting a 4 NSB - 2 ISB topology for ISB I = 1 and 2:
    for each chip c = 0 to 7:
        for each external port p = 0 to 3:
            (A)
            the connected NSB number is (p + 3) mod 4,
            except if p = 1 the connected NSB number is 4
            (B)
            if (c < 4) the connected chip is also c
            if (c = 5 or c = 7) the connected chip is 8 – c
            if (c = 4 or c = 6) the connected chip is 6 – c
            (C)
            if (c < 4) the connected port is 2
            otherwise it is 0
            but if i = 2 the connected port is 2
            otherwise it is 0
            but if I = 2 the connected port is one greater than above With the "4 NSB-2 ISB" (see e.g., FIG. 3) hypothesis, the code first identifies the ISB using (B) and (C) above, and determines ISB 1 is the actual ISB 3, and ISB 2 is the actual ISB 4. No ISB appears to be missing, so the method moves onto the NSB identifications. Using all of (A-C), the method looks for NSB 1-4, but identifies only NSB 3 as the actual NSB 3, and decides the other 3 NSBs are missing. The respective measurements of likelihood are shown in Table 3.

TABLE 3

Exemplary measurements of likelihood

| | |
|---|---|
| iMeas(1, 1) = 3 | iMeas(2, 1) = 0 |
| iMeas(1, 2) = 0 | iMeas(2, 2) = 3 |
| iMeas(1, 3) = 0 | iMeas(2, 3) = 0 |
| iMeas(1, 4) = 0 | iMeas(2, 4) = 0 |
| iMeas(1, 5) = 0 | iMeas(2, 5) = 0 |
| iMeas(1, 6) = 0 | iMeas(2, 6) = 0 |
| nMeas(1, 3) = 6 | nMeas(2, 3) = 0 |
| nMeas(3, 3) = 0 | nMeas(4, 3) = 0 |
| nMeas(1, 4) = 0 | nMeas(2, 4) = 0 |
| nMeas(3, 4) = 0 | nMeas(4, 4) = 0 |
| nMeas(1, 5) = 0 | nMeas(2, 5) = 0 |
| nMeas(3, 5) = 0 | nMeas(4, 5) = 0 |
| nMeas(1, 6) = 0 | nMeas(2, 6) = 0 |
| nMeas(3, 6) = 0 | nMeas(4, 6) = 0 |

At this point, the exemplary method has arrived at the following values.

| | |
|---|---|
| actual number of boards = | 5 |
| logical number of boards = | 6 |
| number of NSB missing = | 3 |
| number of boards not id'ed = | 2 |

Since 5+3=8>6, the identification loop will repeat, with a new logical number of boards set to 6+3=9. For this number of boards, the topology hypothesis becomes "8 NSB-4 ISB" (see, e.g., FIG. 4), because 8 boards is too many for the "4 NSB-2 ISB" (see, e.g., FIG. 3) topology. The rules for connecting an "8 NSB-4 ISB" (see, e.g., FIG. 4) topology are shown in Table 4.

TABLE 4

Exemplary rules for connecting an 8 NSB - 4 ISB topology for ISB i=1, 2, 3 and 4:
    for each chip c = 0 to 7:
        for each external port p = 0 to 3:
            (D)
            if (c < 4) the connected NSB is (p + 3) mod 4
            except if p = 1 the connected NSB is 4
            otherwise the connected NSB is 4 + (p + 3) mod 4
            except if p = 1 the connected NSB is 8
            (E)
            if (c < 4) the connected chip is also c
            otherwise the connected chip is c's complement, defined by
            comp(0) = 6, comp(1) = 7, comp(2) = 4, comp(3) = 5
            and vice-versa
            (F)
            the connected port is (I + 1) mod 4

With the "8 NSB-4 ISB" (see, e.g., FIG. 4) hypothesis, the method first identifies the ISB using (E) and (F) above, and correctly identifies determines ISBs 1, 3 and 4. ISB 2 is missing, but 9+1=10<12, and so the method moves on to the NSB identifications. Using all of (D-F), the method looks for NSB 1-8, and correctly identifies only NSB 2 and 7. The method declares the other NSB are missing. Table 5 shows some exemplary measurements of likelihood.

TABLE 5

Exemplary measurements of likelihood

| | |
|---|---|
| iMeas(1, 1) = 0 | iMeas(2, 1) = 0 |
| iMeas(3, 1) = 4 | iMeas(4, 1) = 0 |
| iMeas(1, 2) = 0 | iMeas(2, 2) = 0 |
| iMeas(3, 2) = 0 | iMeas(4, 2) = 3 |
| iMeas(1, 3) = 3 | iMeas(2, 3) = 0 |
| iMeas(3, 3) = 0 | iMeas(4, 3) = 0 |
| iMeas(1, 4) = 0 | iMeas(2, 4) = 0 |
| iMeas(3, 4) = 0 | iMeas(4, 4) = 0 |
| iMeas(1, 5) = 0 | iMeas(2, 5) = 0 |
| iMeas(3, 5) = 0 | iMeas(4, 5) = 0 |
| nMeas(1, 4) = 0 | nMeas(2, 4) = 12 |
| nMeas(3, 4) = 0 | nMeas(4, 4) = 0 |
| nMeas(1, 5) = 0 | nMeas(2, 5) = 0 |
| nMeas(3, 5) = 0 | nMeas(4, 5) = 0 |
| nMeas(5, 4) = 0 | nMeas(6, 4) = 0 |
| nMeas(7, 4) = 0 | nMeas(8, 4) = 0 |
| nMeas(5, 5) = 0 | nMeas(6, 5) = 0 |
| nMeas(7, 5) = 10 | nMeas(8, 5) = 0 |

At this point, the exemplary method has arrived at the following values.

| | |
|---|---|
| actual number of boards = | 5 |
| logical number of boards = | 9 |
| number of NSB missing = | 6 |
| number of boards not id'ed = | 0 |

Since 5+6=11<12, the method is satisfied with the current topology and switch identifications. With the NSB and ISB identified, the connections are checked one more time against the formulae (D-F), and the two miswires are called out. The miswires show themselves in the measurement numbers for the "8 NSB-4 ISB" (see, e.g., FIG. 4) computations: if things were perfect in this configuration, the nonzero iMeas values would all be 4, and the nonzero nMeas values would all be 12. These values vary due to miswires and non-timing links.

Figure 6:
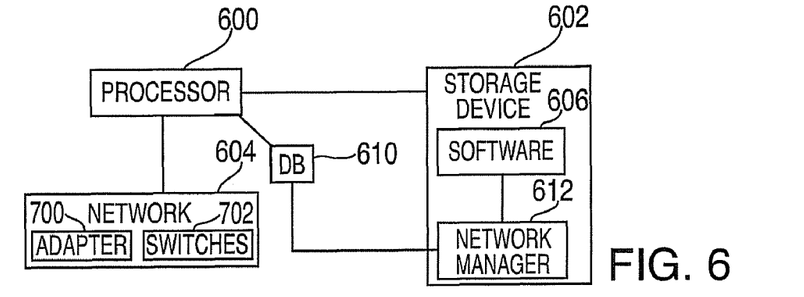
FIG. 6 is an exemplary operating environment for exemplary embodiments of methods.

FIG. 6 is an exemplary operating environment for exemplary embodiments of methods. A processor 600 has access to a storage device 602. Storage device 602 holds an exemplary method for identification of the configuration topology, existing switches, and miswires in a switched network 604. The exemplary method is implemented in software 606. The switched network 604 includes switches 608. In some embodiments, the network provides parallel processing.

Figure 7:
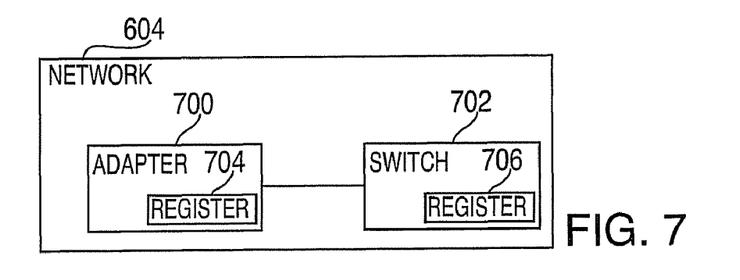
FIG. 7 is an exemplary adapter and an exemplary switch, each having registers accessible by exemplary embodiments of methods.

FIG. 7 is an exemplary adapter 700 and an exemplary switch 702, each having registers 704, 706 accessible by exemplary embodiments of methods. One or more of registers 704, 706 in one or more adapters 700 or switches 702 hold switch connection information, such as what is connected to what, errors in cabling, routes, and the like. For each switch, the connection information can indicate how each port is connected to chips and ports on other switches. The switch connection information is processed to identify the configuration topology, existing switches and miswires. In one embodiment, the connection information is read and stored in a database 610 accessible by processor 600. In one embodiment, a network manager 612 initializes database 610 and then calls the software 606 to identify the configuration topology, existing switches, and miswires.

While the invention has been described with reference to exemplary embodiments, it will be understood by those skilled in the art that various changes may be made and equivalents may be substituted for elements thereof without departing from the scope of the invention. For example, any kind of network may be used and any kind of computers may be used in place of clusters for parallel processing. In addition, many modifications may be made to adapt a particular situation or material to the teachings of the invention without departing from the essential scope thereof. For example, methods may be implemented in software, hardware, firmware, or any combination thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A non-transitory computer storage medium having computer readable instructions stored thereon that, when executed by a computer, implement a method of identifying configuration topologies, existing switches, and miswires in a switched network, wherein the method comprises:
   receiving an existing configuration;
   generating a hypothesis, the hypothesis being one supported topology of a plurality of supported topologies of which the existing configuration is a subset, the existing configuration having at least one existing switch, the supported topology having at least one supported switch;
   performing a best fit of the at least one existing switch to the at least one supported switch using formulae for connections of a maximal supported topology comprising the plurality of supported topologies, wherein the formulae indicate how the existing switches should be connected; and
   identifying the existing configuration as the one of the supported topologies;
   wherein performing the best fit further comprises:
      for any of at least one intermediate switch board (ISB) included in the hypothesis, using the formulae to measure each existing switch's likelihood to be that ISB;
      ranking the ISB likelihood measurements from largest to smallest, so as to identify the at least one ISB;
      for any of at least one node switch board (NSB) included in the hypothesis, using both the identified at least one ISB and the formulae to measure each existing switch's likelihood to be that NSB; and
      ranking the NSB likelihood measurements from largest to smallest, so as to identify the at least one NSB.

2. The computer storage medium of claim 1, wherein the method further comprises identifying any miswires in the existing configuration.

3. The computer storage medium of claim 1, wherein the method further comprises generating a second hypothesis, and setting the hypothesis to the second hypothesis, if at least one of the at least one supported switch are missing or not recognized, the second hypothesis being another supported topology in the plurality of supported topologies.

4. The computer storage medium of claim 1, wherein performing the best fit includes using at least one formulae specifying connections for the supported topology to measure a likelihood that the at least one existing switch matches the at least one supported switch.

5. The computer storage medium of claim 1, wherein the at least one existing switch and the at least one supported switch have a switch type of node switch board (NSB) or intermediate switch board (ISB).

6. A system, comprising:
   a processor in communication with a storage device and with a switched network;
   the storage device including a network manager configured to implement a method of identification of configuration topologies, existing switches, and miswires in the switched network, wherein the method comprises:
   receiving an existing configuration;
   generating a hypothesis, the hypothesis being one supported topology of a plurality of supported topologies of which the existing configuration is a subset, the existing configuration having at least one existing switch, the supported topology having at least one supported switch;
   performing a best fit of the at least one existing switch to the at least one supported switch using formulae for connections of a maximal supported topology comprising the plurality of supported topologies, wherein the formulae indicate how the existing switches should be connected; and identifying the existing configuration as the one of the supported topologies;

wherein performing the best fit further comprises:

for any of at least one intermediate switch board (ISB) included in the hypothesis, using the formulae to measure each existing switch's likelihood to be that ISB;

ranking the ISB likelihood measurements from largest to smallest, so as to identify the at least one ISB;

for any of at least one node switch board (NSB) included in the hypothesis, using both the identified at least one ISB and the formulae to measure each existing switch's likelihood to be that NSB; and ranking the NSB likelihood measurements from largest to smallest, so as to identify the at least one NSB.

7. The system of claim 6, wherein the method further comprises identifying any miswires in the existing configuration.

8. The system of claim 6, wherein the method further comprises generating a second hypothesis, and setting the hypothesis to the second hypothesis, if at least one of the at least one supported switch are missing or not recognized, the second hypothesis being another supported topology in the plurality of supported topologies.

9. The system of claim 6, wherein performing the best fit includes using at least one formulae specifying connections for the supported topology to measure a likelihood that the at least one existing switch matches the at least one supported switch.

10. The system of claim 6, wherein the at least one existing switch and the at least one supported switch have a switch type of node switch board (NSB) or intermediate switch board (ISB).

* * * * *